US012679906B2

(12) United States Patent
Bertani et al.

(10) Patent No.: US 12,679,906 B2
(45) Date of Patent: Jul. 14, 2026

(54) METHOD FOR MANUFACTURING FLUOROELASTOMERS

(71) Applicant: SYENSQO SPECIALTY POLYMERS ITALY S.p.A, Bollate (IT)

(72) Inventors: Daniela Bertani, Milan (IT); Matteo Fantoni, Vanzaghello (IT); Mirko Tavano, Milan (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 542 days.

(21) Appl. No.: 18/257,535

(22) PCT Filed: Sep. 23, 2021

(86) PCT No.: PCT/EP2021/076158
§ 371 (c)(1),
(2) Date: Jun. 14, 2023

(87) PCT Pub. No.: WO2022/128190
PCT Pub. Date: Jun. 23, 2022

(65) Prior Publication Data

US 2025/0270349 A1 Aug. 28, 2025

(30) Foreign Application Priority Data

Dec. 14, 2020 (EP) .................................... 20213775

(51) Int. Cl.

| | |
|---|---|
| ***C08F 2/38*** | (2006.01) |
| ***C08F 2/22*** | (2006.01) |
| ***C08F 4/40*** | (2006.01) |
| ***C08F 214/22*** | (2006.01) |
| ***C08K 5/14*** | (2006.01) |
| ***C08K 5/41*** | (2006.01) |

(52) U.S. Cl.
CPC .................. *C08F 2/38* (2013.01); *C08F 2/22* (2013.01); *C08F 4/40* (2013.01); *C08F 214/22* (2013.01); *C08K 5/14* (2013.01); *C08K 5/41* (2013.01)

(58) Field of Classification Search
CPC .. C08F 2/38; C08F 4/40; C08F 214/22; C08F 2/22; C08F 214/26; C08F 214/28
See application file for complete search history.

(56) References Cited

U.S. PATENT DOCUMENTS

| | | | | |
|---|---|---|---|---|
| 4,035,565 | A | 7/1977 | Apotheker et al. | |
| 4,243,770 | A | 1/1981 | Tatemoto et al. | |
| 4,281,092 | A | 7/1981 | Breazeale | |
| 4,564,662 | A | 1/1986 | Albin | |
| 4,694,045 | A | 9/1987 | Moore | |
| 4,745,165 | A | 5/1988 | Arcella et al. | |
| 4,943,622 | A | 7/1990 | Naraki et al. | |
| 5,173,553 | A | 12/1992 | Albano et al. | |
| 5,447,993 | A | 9/1995 | Logothetis | |
| 5,789,489 | A | 8/1998 | Coughlin et al. | |
| 2007/0100062 | A1 | 5/2007 | Lyons et al. | |
| 2014/0005333 | A1 * | 1/2014 | Fukushi ................ | C08F 214/18 524/805 |
| 2018/0148527 | A1 | 5/2018 | Yagi et al. | |
| 2018/0237628 | A1 | 8/2018 | Yasuda et al. | |
| 2020/0123293 | A1 * | 4/2020 | Chernysheva .......... | C08F 14/22 |
| 2021/0163648 | A1 | 6/2021 | Yasuda et al. | |

FOREIGN PATENT DOCUMENTS

| | | | |
|---|---|---|---|
| EP | 199138 | A2 | 10/1986 |
| WO | 2019002180 | A1 | 1/2019 |
| WO | 2020067492 | A1 | 4/2020 |

OTHER PUBLICATIONS

Pianca M. et al., "End groups in fluoropolymers", Journal of Fluorine Chemistry, 1999, vol. 95, pp. 71-84—Elsevier Science SA (14 pages).
Standard ASTM D1646-07, Standard Test Methods for Rubber—Viscosity, Stress Relaxation, and Pre-Vulcanization Characteristics (Mooney Viscometer), 2007, p. 1-12 (12 pages).
Standard ASTM D395-18, Standard Test Methods for Rubber Property—Compression Set, 2018, p. 1-8 (8 pages).
Standard ASTM D5289-19, Standard Test Method for Rubber Property—Vulcanization Using Rotorless Cure Meters, 2019 , p. 1-9 (9 pages).
International Search Report issued in International Application No. PCT/EP2021/076158 dated Jan. 18, 2022 (3 pages).
Written Opinion issued in International Application No. PCT/EP2021/076158 dated Jan. 18, 2022 (6 pages).

* cited by examiner

*Primary Examiner* — Mark S Kaucher
(74) *Attorney, Agent, or Firm* — Osha Bergman Watanabe & Burton LLP

(57) ABSTRACT

The present invention relates to a method for manufacturing fluoroelastomers having iodinated/brominated chain ends, notably vinylidene fluoride (VDF)-based fluoroelastomers, in emulsion polymerization whereas no addition of fluoro-surfactants or hydrogenated surfactants is required, and to a fluoroelastomers which can be obtained from said method.

9 Claims, No Drawings

METHOD FOR MANUFACTURING FLUOROELASTOMERS

CROSS-REFERENCE TO RELATED PATENT APPLICATIONS

This application is a national stage entry under 35 U.S.C. § 371 of International Application No. PCT/EP2021/076158 filed Sep. 23, 2021, which claims the priority of European Patent Application Nr. 20213775.8, filed Dec. 14, 2020. The entire contents of these applications are explicitly incorporated herein by this reference.

TECHNICAL FIELD

The present invention relates to a method for manufacturing fluoroelastomers having iodinated/brominated chain ends, notably vinylidene fluoride (VDF)-based fluoroelastomers, in emulsion polymerization whereas no addition of fluorosurfactants is required, and to a fluoroelastomers which can be obtained from said method.

BACKGROUND ART

Vulcanized (per)fluoroelastomers have been used in a variety of applications, in particular for manufacturing sealing articles such as oil seals, gaskets, shaft seals and O-rings, because of several desirable properties such as heat resistance, chemical resistance, weatherability, etc.

A frequently used method for manufacturing curable (per)fluoroelastomers, in particular (per)fluoroelastomers having iodine or bromine atoms at polymer chain ends, involves aqueous emulsion polymerization of one or more fluorinated monomers under chain transfer control via the use of iodinated or brominated (fluoro) (hydro) carbon compounds; such polymerization is generally carried out in the presence of fluorinated surfactants, which are required for ensuring latex stability, increasing kinetics, and avoiding build-up or fouling of the reactors.

For example, US 2007/0100062 (DuPont Performance Elastomers L.L.C.) discloses fluoroelastomers having bromine and/or iodine cure sites prepared by emulsion polymerization. While it is broadly discloses that surfactants are optional ingredients, all the examples requires the use of a fluorinated surfactant (eg., perfluoro hexyl ethyl sulfonic acid). More recently, because of increasing issues related the use of fluorinated surfactants, reactions requiring non fluorinated surfactants have been disclosed in the art, for example in US 2018/0237628 and US 2018/0148527 (both in the name of Asahi Glass Company, Limited).

Now, efforts are presently devoted to phase out from the use of fluorinated surfactants and methods are being developed to manufacture (per)fluoropolymer products by aqueous polymerization procedures where no addition of fluorinated surfactants is required and possibly wherein the process is entirely performed in the absence of any surfactants. Stabilizing latexes with no use of fluorosurfactants is generally achieved by playing with end groups chemistry, i.e. adapting conditions so as to generate polar end groups which can positively affect the latex stability.

As far as methods of making fluoroelastomers are concerned, when targeting manufacture of Br/I-containing fluororubbers in the absence of added surfactants, being that (per)fluorinated surfactants or hydrogenated surfactants, also referred to as hydrocarbon surfactants or hydrocarbon emulsifiers) managing the delicate balance between the need of having as many as possible reactive chain ends, so as to have appreciable crosslinking ability, and good sealing performances, while ensuring latex stability, is a challenging task.

On the other side, WO 2019/002180 to Solvay Specialty Polymers Italy S.p.A. (Mar. 1, 2019) pertains to a method for making a VDF-based fluoropolymer, including notably fluoroelastomer, in the presence of a redox-initiating system comprising an organic radical initiator and a compound having a sulfinic acid group, leading to polymers structures having low number of branches. According to this document, fluorosurfactants are generally used, although in paragraph [0068] is mention made of the possibility of avoiding the use of fluorosurfactants. Further paragraph [0040] says that incorporation in fluoroelastomers obtained from this method of iodine or bromine atoms may be achieved by addition during polymerization of iodinate and/or brominated chain transfer agents. All working examples pertain to embodiments whereas use is made of surfactants, and whereas no iodinated or brominated chain ends are used.

SUMMARY OF INVENTION

Now, surprisingly, the Applicant found that the problem of providing I/Br terminated (per)fluoroelastomers possessing outstanding crosslinking ability, and sealing performances, while delivering acceptable polymerization kinetics with no fouling/build-up and with good latex stability, can be solved by conducting an emulsion polymerization process comprising the reaction of at least one unsaturated fluorinated monomer in the presence of a I/Br chain transfer agent and a redox-initiating system comprising at least one organic peroxide and at least one compound bearing a sulfinic acid group, to the condition of strictly limiting the amounts of the initiator system's ingredients and the chain transfer agent, while setting a precise ratio between the initiator system's ingredients and the chain transfer agent.

Thus, in a first aspect, the present invention relates to a method of making a (per)fluoroelastomer comprising Iodine and/or Bromine chain ends [fluoroelastomer (A)], said method comprising polymerizing vinylidene fluoride (VDF), in the presence of at least one second (per)fluorinated monomer [monomer ($M_F$)] different from VDF, in an aqueous emulsion in the presence of a chain transfer agent having I and/or Br atoms (preferably I atoms) [agent (CTA-X)] and in the presence of a redox-initiating system [system (R)] comprising at least one organic radical initiator [initiator (O)] and at least one composition [composition (CS)] comprising at least one compound [compound (S)] bearing at least one sulfinic acid group, wherein:

- the amount of initiator (O) is of at least 1.50 and at most 15.00 mmol of $O_2$ per kg of fluoroelastomer (A);
- the amount of compound (S) is of at least 0.20 and at most 2.00 g per kg of fluoroelastomer (A); and
- the ratio between agent (CTA-X) and composition (CS) is of at least 2.00 and of at most 8.00 g of X/g of composition (CS), whereas X is the amount of I and/or Br in the agent (CTA-X); and wherein said emulsion polymerization is carried out without addition of any fluorinated surfactant or hydrogenated surfactant.

The Applicant surprisingly found that the method according to the present invention allows to manufacture with reasonable kinetics latexes of I/Br-containing (per)fluoroelastomers possessing high Mooney viscosities (i.e. high molecular weight), outstanding curing behaviour, good sealing properties, and which provide for colloidal stability in aqueous phase, so that no significant build-up or fouling in the reactor occurs, nor any unwanted coagulation phenomena.

Advantageously, the latexes of high molecular weight (per)fluoroelastomers of the present invention while being free from any added fluorosurfactant or hydrogenated surfactant, have a limited amount of polar end groups of formula —$CH_2OH$, a limited amount of hydrogenated chain ends (such as those of formula —$CF_2H$, —$CF_2CH_3$, —$CH_2CH_3$ and —$C(CH_3)_3$), while possessing a high fraction of halogenated chain ends.

Thus, in a second aspect, the present invention relates to an aqueous latex, comprising particles of at least one fluoroelastomer (A), i.e. a (per)fluoroelastomer comprising Iodine and/or Bromine chain ends, wherein said fluoroelastomer (A) comprises recurring units derived from VDF and from at least one monomer ($M_F$) different from VDF, wherein said fluoroelastomer (A):

- possesses a Mooney viscosity (ML) (1+10) at 121° C. of at least 10 MU;
- comprises —$CH_2OH$ chain ends in an amount of zero to less than 5 mmol/kg of fluoroelastomer (A);
- comprises hydrogen-comprising chain ends selected from the group consisting of —$CF_2H$ and —$CF_2CH_3$ in an amount of 0.01 to 10 mmol/kg of fluoroelastomer (A);
- comprises I/Br containing chain ends of formula —$CH_2$—X (with X being I or Br, preferably I) in an amount of at least 65% moles, with respect to the total moles of chain ends,
- wherein said latex is produced by emulsion polymerization without addition of any fluorinated surfactant or hydrogenated surfactant.

Still, in a further aspect, the present invention relates to an fluoroelastomer (A), i.e. a (per)fluoroelastomer comprising Iodine and/or Bromine chain ends, wherein said fluoroelastomer (A) comprises recurring units derived from VDF and from at least one monomer ($M_F$) different from VDF, wherein said fluoroelastomer (A):

- possesses a Mooney viscosity (ML) (1+10) at 121° C. of at least 10 MU;
- comprises —$CH_2OH$ chain ends in an amount of zero to less than 5 mmol/kg of fluoroelastomer (A);
- comprises hydrogen-comprising chain ends selected from the group consisting of —$CF_2H$ and —$CF_2CH_3$ in an amount of 0.01 to 10 mmol/kg of fluoroelastomer (A);
- comprises I/Br containing chain ends of formula —$CH_2$—X (with X being I or Br, preferably I) in an amount of at least 65% moles, with respect to the total moles of chain ends,
- wherein said fluoroelastomer is produced by emulsion polymerization without addition of any fluorinated surfactant or hydrogenated surfactant.

In a still further aspect, the present invention relates to a curable composition comprising:

- at least one fluoroelastomer (A), i.e. a (per)fluoroelastomer comprising Iodine and/or Bromine chain ends, wherein said fluoroelastomer (A) comprises recurring units derived from VDF and from at least one monomer ($M_F$) different from VDF, wherein said fluoroelastomer (A):
- possesses a Mooney viscosity (ML) (1+10) at 121° C. of at least 10 MU;
- comprises —$CH_2OH$ chain ends in an amount of zero to less than 5 mmol/kg of fluoroelastomer (A);
- comprises hydrogen-comprising chain ends selected from the group consisting of —$CF_2H$ and —$CF_2CH_3$ in an amount of 0.01 to 10 mmol/kg of fluoroelastomer (A);
- comprises I/Br containing chain ends of formula —$CH_2$—X (with X being I or Br, preferably I) in an amount of at least 65% moles, with respect to the total moles of chain ends,
- wherein said fluoroelastomer is produced by emulsion polymerization without addition of any fluorinated surfactant or hydrogenated surfactant; and
- at least one organic peroxide.

A method of making a cured part, and a cured part obtained from the curable composition above are additional objects of the present invention.

DESCRIPTION OF EMBODIMENTS

For the purposes of the present description and of the following claims:

- the use of parentheses around symbols or numbers identifying the formulae, for example in expressions like "fluoroelastomer (A)", etc., has the mere purpose of better distinguishing the symbol or number from the rest of the text and, hence, said parenthesis can also be omitted;
- the expression "essentially consists of", when used in combination with repeat units of fluoroelastomer (A), is intended to indicate that minor amounts of end chains, defects, irregularities and monomer rearrangements are tolerated in fluoroelastomer (A), provided that their amount is below 5 moles % based on the total moles of the fluoroelastomer (A), more preferably below 2 moles %, even more preferably below 1 moles %;
- the terms "1,1-difluoroethylene", "1,1-difluoroethene" and "vinylidene fluoride" are used as synonyms, and referred to with the acronym "VDF";
- the term "fluoroelastomer" is intended to indicate essentially amorphous polymer(s), preferably having a low degree of crystallinity (having a heat of fusion of less than 5 J/g, preferably of less than 3 J/g, more preferably of less than 1 J/g, as measured by ASTM D-3418) and a glass transition temperature (Tg) below room temperature, as measured by ASTM D-3418. The fluoroelastomer has advantageously a Tg below 10° C., preferably below 5° C., more preferably below 0° C.;
- the expression "fluorinated surfactant" is intended to indicate partially and fully fluorinated surfactants.

Non limitative examples of suitable monomers ($M_F$) are notably:

(a) $C_2$-$C_8$ perfluoroolefins, such as tetrafluoroethylene (TFE) and hexafluoropropylene (HFP);

(b) hydrogen-containing $C_2$-$C_8$ olefins different from VDF, such as vinyl fluoride (VF), trifluoroethylene (TrFE), perfluoroalkyl ethylenes of formula $CH_2$=CH—$R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, e.g. —$CF_3$, —$C_2F_5$, —$C_3F_7$;

(e) (per)fluoro-oxy-alkylvinylethers of formula $CF_2$=CFOX, wherein X is a $C_1$-$C_{12}$ [(per)fluoro]-oxyalkyl comprising catenary oxygen atoms, e.g. the perfluoro-2-propoxypropyl group;

(f) (per)fluorodioxoles having formula:

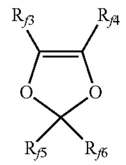

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $—CF_3$, $—C_2F_5$, $—C_3F_7$, $—OCF_3$, $—OCF_2CF_2OCF_3$; preferably, perfluorodioxoles;

(g) (per)fluoro-methoxy-vinylethers (MOVE, hereinafter) having formula: $CFX_2═CX_2OCF_2OR''_f$ wherein $R''_f$ is selected among linear or branched $C_1$-$C_6$ (per)fluoroalkyls; $C_5$-$C_6$ cyclic (per)fluoroalkyls; and $C_2$-$C_6$ (per) fluorooxyalkyls, linear or branched, comprising from 1 to 3 catenary oxygen atoms, and $X_2═F$, H; preferably $X_2$ is F and $R''_f$ is $—CF_2CF_3$ (MOVE1); $—CF_2CF_2OCF_3$ (MOVE2); or $—CF_3$ (MOVE3).

It is generally preferred that said fluoroelastomer (A) comprises, in addition to recurring units derived from VDF, recurring units derived from HFP.

In this case, fluoroelastomer (A) typically comprises at least 10% moles, preferably at least 12% moles, more preferably at least 15% moles of recurring units derived from HFP, with respect to all recurring units of the fluoroelastomer (A).

Still, fluoroelastomer (A) typically comprises at most 45% moles, preferably at most 40% moles, more preferably at most 35% moles of recurring units derived from HFP, with respect to all recurring units of the fluoroelastomer (A).

The fluoroelastomer (A) may comprise, in addition to recurring units derived from VDF and HFP, one or more of the followings:

recurring units derived from at least one bis-olefin [bis-olefin (OF)] having general formula:

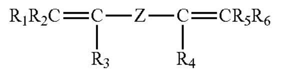

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one (per)fluorinated monomer different from VDF and HFP; and recurring units derived from at least one hydrogenated monomer.

Examples of hydrogenated monomers are notably non-fluorinated alpha-olefins, including ethylene, propylene, 1-butene, diene monomers, styrene monomers, alpha-olefins being typically used. $C_2$-$C_8$ non-fluorinated alpha-olefins (Ol), and more particularly ethylene (E) and propylene (F), will be selected for achieving increased resistance to bases.

The bis-olefin (OF) is preferably selected from the group consisting of those complying with formulae (OF-1), (OF-2) and (OF-3):

(OF-1)

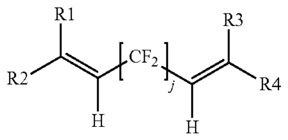

wherein j is an integer between 2 and 10, preferably between 4 and 8, and $R_1$, $R_2$, $R_3$, $R_4$, equal or different from each other, are H, F or $C_{1-5}$ alkyl or (per)fluoroalkyl group; a preferred bis-olefin of (OF-1) type is $H_2C═CH—(CF_2)_6—CH═CH_2$.

(OF-2)

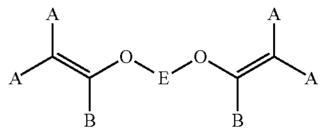

wherein each of A, equal or different from each other and at each occurrence, is independently selected from F, Cl, and H;

each of B, equal or different from each other and at each occurrence, is independently selected from F, Cl, H and $OR_B$, wherein $R_B$ is a branched or straight alkyl chain, which can be partially, substantially or completely fluorinated or chlorinated;

E is a divalent group having 2 to 10 carbon atom, optionally fluorinated, which may be inserted with ether linkages; preferably E is a $—(CF_2)_m—$ group, with m being an integer from 3 to 5;

a preferred bis-olefin of (OF-2) type is $F_2C═CF—O—(CF_2)_5—O—CF═CF_2$.

(OF-3)

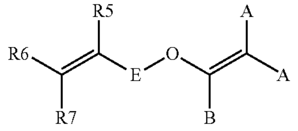

wherein E, A and B have the same meaning as above defined; $R_5$, $R_6$, $R_7$, equal or different from each other, are H, F or $C_{1-5}$ alkyl or (per)fluoroalkyl group.

When a bis-olefin is employed, the resulting fluoroelastomer (A) typically comprises from 0.01% to 5% by moles of units deriving from the bis-olefin with respect to the total amount of units of said fluoroelastomer (A).

Optionally, said fluoroelastomer (A) may comprise cure-site containing recurring units, i.e. units derived from monomers possessing cure sites.

Among cure-site containing recurring units, mention can be notably made of: (CSM-1) iodine or bromine containing monomers of formula:

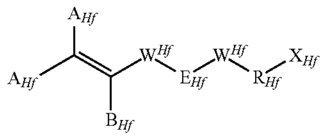

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a $-(CF_2)_m-$ group, with m being an integer from 3 to 5;

(CSM-2) ethylenically unsaturated compounds comprising cyanide groups, possibly fluorinated.

Among cure-site containing monomers of type (CSM1), preferred monomers are those selected from the group consisting of: (CSM1-A) iodine-containing perfluorovinylethers of formula:

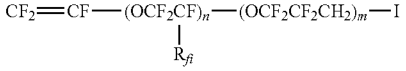

with m being an integer from 0 to 5 and n being an integer from 0 to 3, with the provision that at least one of m and n is different from 0, and $R_{fi}$ being F or $CF_3$; (as notably described in U.S. Pat. No. 4,745,165 (AUSIMONT S.P.A.), U.S. Pat. No. 4,564,662 (MINNESOTA MINING) and EP 199138 A (DAIKIN IND., LTD.); and (CSM-1B) iodine-containing ethylenically unsaturated compounds of formula:

$$CX^1X^2=CX^3-(CF_2CF_2)_p-I$$

wherein each of $X^1$, $X^2$ and $X^3$, equal to or different from each other, are independently H or F; and p is an integer from 1 to 5; among these compounds, mention can be made of $CH_2=CHCF_2CF_2I$, $I(CF_2CF_2)_2CH=CH_2$, $ICF_2CF_2CF=CH_2$, $I(CF_2CF_2)_2CF=CH_2$;

(CSM-1C) iodine-containing ethylenically unsaturated compounds of formula:

$$CHR=CH-Z-CH_2CHR-I$$

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2=CH-(CF_2)_4CH_2CH_2I$, $CH_2=CH-(CF_2)_6CH_2CH_2I$, $CH_2=CH-(CF_2)_8CH_2CH_2I$, $CH_2=CH-(CF_2)_2CH_2CH_2I$;

(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) or other compounds bromo and/or iodo alpha-olefins disclosed in U.S. Pat. No. 4,694,045 (DU PONT).

Among cure-site containing monomers of type (CSM2), preferred monomers are those selected from the group consisting of:

(CSM2-A) perfluorovinyl ethers containing cyanide groups of formula $CF_2=CF-(OCF_2CFX^{CN})_m-O-(CF_2)_n-CN$, with $X^{CN}$ being F or $CF_3$, m being 0, 1, 2, 3 or 4; n being an integer from 1 to 12;

(CSM2-B) perfluorovinyl ethers containing cyanide groups of formula $CF_2=CF-(OCF_2CFX^{CN})_{m'}-O-CF_2-CF(CF_3)-CN$, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT), U.S. Pat. No. 5,447,993 (DU PONT) and U.S. Pat. No. 5,789,489 (DU PONT).

It is nonetheless generally preferred for the fluoroelastomer (A) not to comprise recurring units derived from cure site-containing monomers.

Preferred fluoroelastomers (A) are those having following compositions (in mol. %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;

(ii) vinylidene fluoride (VDF) 50-80%, perfluoroalkyl vinyl ethers (PAVE) 5-50%, tetrafluoroethylene (TFE) 0-20%, bis-olefin (OF) 0-5%;

(iii) vinylidene fluoride (VDF) 20-30%, $C_2$-$C_8$ non-fluorinated olefins (Ol) (in particular E or P) 10-30%, hexafluoropropene (HFP) and/or perfluoroalkyl vinylethers (PAVE) 18-27%, tetrafluoroethylene (TFE) 10-30%, bis-olefin (OF) 0-5%; tetrafluoroethylene (TFE) 50-80%, perfluoroalkyl vinyl ethers (PAVE) 20-50%, bis-olefin (OF) 0-5%;

(iv) tetrafluoroethylene (TFE) 45-65%, $C_2$-$C_8$ non-fluorinated olefins (01) 20-55%, vinylidene fluoride 0-30%, bis-olefin (OF) 0-5%;

(v) tetrafluoroethylene (TFE) 32-60% mol %, $C_2$-$C_8$ non-fluorinated olefins (01) 10-40%, perfluoroalkyl vinyl ethers (PAVE) 20-40%, fluorovinyl ethers (MOVE) 0-30%, bis-olefin (OF) 0-5%;

(vi) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

(vii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;

(viii) tetrafluoroethylene (TFE) 20-70%, fluorovinyl ethers (MOVE) 30-80%, perfluoroalkyl vinyl ethers (PAVE) 0-50%, bis-olefin (OF) 0-5%.

More preferred fluoroelastomers (A) are those comprising vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%.

Indeed, as mentioned above, fluoroelastomer (A) has iodine and/or bromine chain ends, which hence already provide for effective cure site for crosslinking.

As said, the I and/or Br atoms are comprised in the fluoroelastomer (A) as terminal groups of the fluoroelastomer (A) chain. As explained, this is obtained in the method of the present invention by addition to the polymerization medium during fluoroelastomer manufacture of at least one iodinated/brominated chain transfer agent [agent (CTA-X)]. Said agent (CTA-X) is preferably selected from the group consisting of:

- iodinated and/or brominated organic chain-transfer agent(s); suitable organic chain-transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND., LTD.) and U.S. Pat. No. 4,943,622 (NIPPON MEKTRON KK.); and
- alkali metal or alkaline-earth metal iodides and/or bromides, such as described notably in U.S. Pat. No. 5,173,553 (AUSIMONT SRL.).

This said, preferred agents (CTA-X) are iodinated and/or brominated organic chain-transfer agent(s), more preferably those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$, and most preferably those of formula $R'_f(I)_{x'}(Br)_{y'}$, in which $R'_f$ is a perfluoroalkyl containing from 1 to 8 carbon atoms, while x' and y' are integers between 0 and 2, with $1 \leq x'+y' \leq 2$, most preferably x'=2 and y'=0.

In the method of the present invention, agents (CTA-X) which are iodinated are preferred, in particular those of formula $R_f(I)_2$ or $R'_f(I)_2$ with $R_f$ and $R'_f$ being as above detailed.

As above explained, the ratio between agent (CTA-X) and composition (CS) in the method of the invention is of at least 2.00 and of at most 8.00 g of X/g of composition (CS), whereas X is the amount of I and/or Br in the agent (CTA-X). The Applicant has found that the careful control of this weight ratio is essential to ensure generation of radicals and chain ends in the targeted fluoroelastomer (A) such as to provide for colloidal stability and outstanding reactivity in crosslinking, so that cured parts therefrom have outstanding sealing performances.

Such weight ratio between halogen of agent (CTA-X) and composition (CS) is preferably of at least 2.50, more preferably of at least 3.20, and even more preferably of at least 3.40 and of at most 7.60, preferably of at most 7.50, more preferably of at most 7.00 g of X/g of composition (CS), whereas X is the amount of I and/or Br in the agent (CTA-X).

As agent (CTA-X) is preferably a iodinated chain transfer agent, the amounts of (CTA-X) and composition (CS) are such that the iodine/composition (CS) ratio is of at least 2.00, advantageously at least 2.50, preferably at least 3.00, more preferably of at least 3.20, and even more preferably of at least 3.40 and of at most 7.60, preferably of at most 7.50, more preferably of at most 7.00 g of I/g of composition (CS).

As explained, the method of the present invention comprises polymerizing VDF and at least one monomer ($M_F$) in the presence of a redox-initiating system [system (R)] comprising at least one organic radical initiator [initiator (O)] and at least one composition [composition (CS)] comprising at least one compound [compound (S)] bearing at least one sulfinic acid group, and optionally further ingredients.

Any of those initiators (O) which are known to initiate polymerization of vinylidene fluoride can be used. Among them, mention can be made of:

(a) azo-compounds, such as 2,2'-azobis(4-methoxy-2,4dimethylvaleronitrile), 2,2'-azobis (2,4-dimethyl-valeronitrile); tert-butylazo-2-cyanobutane, 2,2'-azobis (isobutyronitrile);

(b) diacylperoxides such as diacetylperoxide, disuccinyl peroxide, dipropionylperoxide, dibutyrylperoxide, dibenzoylperoxide, dilauroyl-peroxide; benzoylacetylperoxide, diglutaric acid peroxide;

(c) dialkylperoxides, including notably ditertbutylperoxide (DTBP), t-butyl cumyl peroxide; 2,5-dimethyl-2,5-di(t-butylperoxy)hexane; dicumyl peroxide; 1,1-di(t-butylperoxy)-3,3,5-trimethylcyclohexane; di-tertamyl peroxide;

(d) hydroperoxides, including notably t-butyl hydroperoxide (TBHP), cumene hydroperoxide, tertiaryamylhydroperoxide;

(e) per-acids esters and salts thereof such as e.g. ammonium, sodium or potassium salts. Examples of per-acids include peracetic acid. Esters of the peracid can be used as well and examples thereof include tert-butyl peroxybenzoate, tert-butylperoxyacetate and tert-butylperoxypivalate;

(f) peroxydicarbonates, including notably diisopropylperoxydicarbonate, tert-butyl-peroxyisopropylcarbonate; di-n-propylperoxydicarbonate, dicyclohexylperoxydicarbonate, di-n-butyl peroxydicarbonate, di-2-ethylhexylperoxydicarbonate, dimyristyl peroxydicarbonate, dicetyl peroxydicarbonate, diethylperoxydicarbonate.

Initiators (O) are preferably selected among organic peroxides, and in particular, among those listed above under (b) to (f).

As said, in the method of the invention, the amount of initiator (O) is of at least 1.50 and at most 15.00 mmol of $O_2$ per kg of fluoroelastomer (A).

Such amount is expressed in terms of mmoles of —O—O— (peroxide) moieties in the said initiator (O), and is representative of the amount of active oxygen atoms which contributes to the creation of radical species.

For any initiator (O) which does not comprise any peroxide moiety, the mmoles of —O—O— (peroxide) moieties in the said initiator (O) can be equally determined based on the decomposition mechanism leading to the creation of radical species; an organic azo group is notably known to decompose with eliminating nitrogen and generating two radical species, and hence it is equivalent, in terms of radical species' creation, to —O—O— (peroxide) moieties.

Preferably, initiator (O) is used in the method of the invention in an amount of at most 15.00, more preferably at most 12.00, even more preferably at most 10.00 mmol of $O_2$ per kg of fluoroelastomer (A); and/or in an amount of preferably at least 1.80, more preferably at least 2.00, even more preferably at least 2.50 mmol of $O_2$ per kg of fluoroelastomer (A).

When combining the use of initiator (O) with composition (CS), as mentioned above, it is essential for the initiator (O) to be used in an amount of at most 15.00 mmol of $O_2$ per kg of fluoroelastomer (A), so as to enable sufficient generation of radicals, and hence, polar chain ends, through action of the components of the composition (CS), which are of material importance for achieving latex colloidal stability during polymerization.

On the other side, an amount of initiator (O) of at least 1.50 mmol of $O_2$ per kg of fluoroelastomer (A) is required, when combined with composition (CS), for achieving acceptable polymerization rates, thanks to the synergistic effect of composition (CS).

It is also been found that best results have been found whereas the molar ratio between the halogen content of (CTA-X) and the peroxide content of the initiator (O) is of at least 3.00 in mol of X/mol of $O_2$, preferably at least 3.50 in mol of X/mol of $O_2$, more preferably at least 4.00 in mol of X/mol of $O_2$ and/or of at most 15.00 in mol of X/mol of $O_2$, preferably of at most 13.00 in mol of X/mol of $O_2$, more preferably of at most 12.00 in mol of X/mol of $O_2$.

Such molar ratio between agent (CTA-X) and initiator (O) is expressed in mol of X/mol of $O_2$, whereas mol of X is the molar amount of I and/or Br in the agent (CTA-X) and mol of $O_2$ is the molar amount of peroxide moieties (—O—O—) in the initiator (O). The Applicant has found that the careful control of this weight ratio is essential to ensure generation of radicals and chain ends in the targeted fluoroelastomer (A) such as to provide for colloidal stability and outstanding reactivity in crosslinking, so that cured parts therefrom have outstanding sealing performances.

As said, in the method of the invention, polymerizing VDF and at least one monomer ($M_F$) takes place in the presence of at least one composition [composition (CS)] comprising at least one compound [compound (S)] bearing at least one sulfinic acid group.

Compound (S) is an organic compound, having the said sulfinic acid group bound to a carbon atom.

The expression "bearing at least one sulfinic acid group" is used herein to mean that compound (S) may include said sulfinic acid group in its acid form, i.e. as a —S(O)—OH group, or in its salified form, i.e. as a $—S(O)—O—]_m[Y_a^{m+}]$ sulfinic salt group, whereas $Y_a$ is a m-valent cation, and m is an integer.

Generally, compound (S) comprises said sulfinic acid group under the form of a sulfinic salt group, as above described.

Preferably, said compound (S) complies with the following formula (S-I):

(S-I)

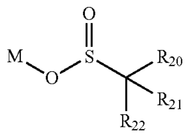

wherein

M is a hydrogen atom, an ammonium ion, a monovalent metal ion;

$R_{20}$ is —OH or $—N(R^4)(R^5)$ where each of $R^4$ and $R^5$, identical or different from one another, are hydrogen atom or linear or branched alkyl chain having from 1 to 6 carbon atoms;

$R_{21}$ is hydrogen atom, linear or branched alkyl group having from 1 to 6 carbon atoms, 5- or 6-membered cycloalkyl group, 5- or 6-membered aryl group;

$R_{22}$ is —COOM, $—SO_3M$, $—C(═O)R^4$, $—C(═O)N(R^4)(R^5)$, $—C(═O)OR^4$, wherein M, $R^4$ and $R^5$ are as defined above, and salt thereof with at least one monovalent metal ion.

Preferably, M is hydrogen atom or a monovalent metal ion.

Preferably, said monovalent metal ion is selected from sodium and potassium.

Preferably, $R_{20}$ is selected from hydroxyl or amino group.

Preferably, $R_{21}$ is selected from hydrogen atom, linear or branched alkyl group having from 1 to 3 carbon atoms, and 5- or 6-membered aryl group.

Preferably, $R_{22}$ is selected from —COOM, $—SO_3M$, and $C(═O)OR^4$, wherein M, $R^4$ and $R^5$ are as defined above.

A preferred compound (S) complies with formula (S-I) above, wherein M is sodium, $R_{20}$ is —OH, $R_{21}$ is hydrogen atom and $R_{22}$ is selected from —COOM, $—SO_3M$, and $C(═O)OR^4$, wherein M, $R^4$ and $R^5$ are as defined above.

A more preferred compound (S) complies with formula (S-I) above, wherein M is sodium, $R_{20}$ is —OH, $R_{21}$ is hydrogen atom and $R_{22}$ is —COOM, with M being sodium.

Preferably, said composition (CS) comprises at least 10 wt. %, preferably at least 20 wt. %, more preferably at least 25 wt. % of a compound complying with formula (S-I) as defined above, with respect to the total weight of said composition (CS).

Preferably, said composition (CS) comprises at most 50 wt. %, preferably at most 45 wt. %, more preferably at least 40 wt. % of a compound complying with formula (S-I) as defined above, with respect to the total weight of said composition (CS).

Preferably, said composition (CS) further comprises a compound comprising at least one sulfonic acid group [compound ($S_3$)].

The expression "bearing at least one sulfonic acid group" is used herein to mean that compound (S) may include said sulfonic acid group in its acid form, i.e. as a $—S(O)_2—OH$ group, or in its salified form, i.e. as a $—S(O)_2—O—]_m[Y_a^{m+}]$ sulfonic salt group, whereas $Y_a$ is a m-valent cation, and m is an integer.

Generally, compound (S) comprises said sulfonic acid group under the form of a sulfonic salt group, as above described.

Preferably, said compound ($S_3$) complies with the following formula ($S_3$—I):

($S_3$-I)

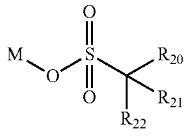

wherein M, $R_{20}$, $R_{21}$ and $R_{22}$ have the same meaning defined above for compound of formula (S-I); in particular M is a monovalent metal ion.

Preferably, said composition (CS) comprises at least 5 wt. %, preferably at least 10 wt. %, more preferably at least 15 wt. % of a compound complying with formula ($S_3$—I) as defined above, with respect to the total weight of said composition (CS).

Preferably, said composition (CS) comprises at most 50 wt. %, preferably at most 45 wt %, more preferably at most 40 wt. % of a compound complying with formula ($S_3$—I) as defined above, with respect to the total weight of said composition (CS).

According to certain embodiments, said composition (CS) further comprises sulphurous acid or a salt thereof (also referred to as "sulfite"), i.e. a compound of formula MO—S(O)—OM, with each of M, equal or different from each other, being independently as above detailed, with M being preferably H and/or Na, such as notably in sodium sulphite, and in sodium hydrogen sulphite.

Preferably, said composition (CS) comprises at least 1 wt. %, preferably at least 3 wt. %, more preferably at least 5 wt.

% of said sulphurous acid or a salt thereof, with respect to the total weight of said composition (CS).

Preferably, said composition (CS) comprises at most 40 wt. %, preferably at most 30 wt. %, more preferably at most 25 wt. % of said sulphurous acid or a salt thereof, with respect to the total weight of said composition (CS).

Further, according to certain embodiments, said composition (CS) further comprises sulphuric acid or a salt thereof (also referred to as "sulfate"), i.e. a compound of formula MO—$S(O)_2$—OM, with each of M, equal or different from each other, being independently as above detailed, with M being preferably H and/or Na, such as notably in sodium sulphate, and in sodium hydrogen sulphate.

Preferably, said composition (CS) comprises at least 5 wt. %, preferably at least 8 wt. %, more preferably at least 10 wt. % of said sulphuric acid or a salt thereof, with respect to the total weight of said composition (CS).

Preferably, said composition (CS) comprises at most 40 wt. %, preferably at most 30 wt. %, more preferably at most 25 wt. % of said sulphuric acid or a salt thereof, with respect to the total weight of said composition (CS).

According to preferred embodiments, composition (CS) is a mixture essentially consisting of at least one compound (S) of formula (S-I), at least one compound (S) of formula ($S_3$—I), at least one sulfite and at least one sulfate.

The expression 'essentially consisting of', when used in liaison with the constituting ingredients of composition (CS) is meant to imply that additional minor amounts (<1 wt. %) of other compounds may be present as by-products or impurities, without this affecting effectiveness of the composition (CS) in the method of the present invention.

According to preferred embodiments, composition (CS) is a mixture essentially consisting of:

- 10 to 50, preferably 20 to 45, more preferably from 25 to 40 wt. % of at least one compound (S) of formula (S-I);
- 5 to 50, preferably 10 to 45, more preferably from 15 to 40 wt. % of at least one compound (S) of formula ($S_3$—I);
- 1 to 40, preferably 3 to 30, more preferably from 5 to 25 wt. % of at least one sulfite;
- 5 to 40, preferably 8 to 30, more preferably from 10 to 25 wt. % of at least one sulfate, with wt. % being based on the total weight of composition (CS).

Suitable examples of said composition (CS) are commercially available from BRÜGGEMANN-GROUP under the trade name Bruggolite®. In particular, the mixture commercialized as Bruggolite® E28 has been found to be particularly useful within the frame of the present invention.

As said, in the method of the present invention, said emulsion polymerization is carried out in the absence of any added fluorinated surfactant or hydrogenated surfactant.

Notably, emulsion polymerization is carried out without adding any fluorinated surfactants complying with the following formula:

$$R^{*}—X^{B-}(T^{+})$$

wherein

- $R^*$ is a $C_5$-$C_{16}$ (per)fluoroalkyl chain or a (per)fluoropolyoxyalkylenic chain including one or more than one ethereal oxygen,
- $X^{B-}$ is —$COO^-$ or —$SO_3^-$,
- $T^+$ is selected from: $H^+$, $NH_4^+$, and an alkaline metal ion.

Exemplary embodiments of fluorinated surfactants which are not added in the method of the present invention are notably: ammonium perfluoro-octanoate; (per)fluoropolyoxy-alkylenes ended with one or more carboxylic groups, optionally salified with sodium, ammonium and alkaline metals, more preferably salified with sodium; and partially fluorinated alkylsulphonates.

Exemplary embodiments of hydrogenated surfactants which are not added in the method of the present invention are notably: sodium lauryl sulfate, sodium dodecylbenzenesulfonate.

Advantageously, the method of the present invention comprises polymerizing VDF with at least one further monomer ($M_F$) as defined above, in an aqueous emulsion in the presence of system (R) as defined above, and optionally further ingredients.

The method according to the present invention can be preferably performed in continuous, or semi-batch or batch.

The method of the present invention is performed at a temperature that can be selected from the person skilled in the art, notably on the basis of the organic peroxide. Preferably, the method of the present invention is performed at a temperature from 40° C. to 120° C., more preferably from 50° C. to 100° C.

The method of the present invention is preferably performed at a pressure between 10 and 60 bars, more preferably from 25 to 55 bars.

As said, another object of the invention is an aqueous latex, comprising particles of at least one fluoroelastomer (A), as above detailed, and possibly complying with all features listed above for fluoroelastomer (A), wherein said fluoroelastomer (A):

- possesses a Mooney viscosity (ML) (1+10) at 121° C. of at least 10 MU;
- comprises —$CH_2OH$ chain ends in an amount of zero to less than 5 mmol/kg of fluoroelastomer (A);
- comprises hydrogen-comprising chain ends selected from the group consisting of —$CF_2H$ and —$CF_2CH_3$ in an amount of 0.01 to 10 mmol/kg of fluoroelastomer (A);
- comprises I/Br containing chain ends of formula —$CH_2$—X (with X being I or Br, preferably I) in an amount of at least 65% moles, with respect to the total moles of chain ends,
- wherein said latex is produced by emulsion polymerization without addition of any fluorinated surfactant or hydrogenated surfactant.

Without being bound by this theory, the Applicant believes that, although the measured amount of —$CH_2OH$ chain ends may be below the detection limit of the technique used for its determination (see experimental section), it is generally understood that a non-zero concentration of —$CH_2OH$ chain ends is the inevitable result of the use of the initiator system combining the initiator (O) and the composition (CS) including the compound (S), which enables achieving sufficient colloidal stability during polymerization, such as to avoid fouling, reactor build-up or premature coagulation phenomena during the manufacture of the latex of fluoroelastomer (A).

Amounts of —$CH_2OH$ chain ends below the detection limit (0.05 mmol/Kg of fluoroelastomer (A)) have been determined on certain preferred embodiments of the invention; the overall colloidal system provided by the ingredients used in the method of making the said fluoroelastomer (A) is believed to positively influence the ability of particles of such fluoroelastomer (A), having so limited number of polar chain ends, to possess colloidal stability.

Another important attribute of the fluoroelastomer (A) is the fact that it comprises hydrogen-comprising chain ends selected from the group consisting of —$CF_2H$ and $-CF_2CH_3$, which are the typical fingerprint of the use of an organic initiator, as used in the method for producing the same. The amount of such chain ends is nevertheless limited, in order not to affect latex stability (related to $-CH_2OH$ chain ends) nor crosslinking ability and crosslinking density (related to $-CH_2-X$ chain ends). Generally, the combined amount of chain ends of formula $-CF_2H$ and $-CF_2CH_3$ is of less than 8 mmol/kg, preferably less than 5 mmol/kg, even more preferably less than 3 mmol/kg.

The fluoroelastomer (A) comprises I/Br containing chain ends of formula $-CH_2-X$ (with X being I or Br, preferably I) in an amount of at least 65% moles, preferably at least 68% moles, more preferably at least 70% moles, with respect to the total moles of chain ends. In particular, fluoroelastomer (A) comprises I-containing chain ends of formula $-CH_2-I$ in an amount of at least 65% moles, preferably at least 68% moles, more preferably at least 70% moles, with respect to the total moles of chain ends.

Such end groups are not only important for ensuring suitable reactivity in crosslinking and for developing appropriate crosslinking density, but also may contribute to the colloidal stability required for sustaining emulsion polymerization without the addition of fluorinated surfactants.

As said, the fluoroelastomer (A) possesses a Mooney viscosity (ML) (1+10) at 121° C. of at least 10, preferably at least 15, more preferably at least 20 Mooney Unit (MU), when determined according to ASTM D1646; and/or a Mooney Viscosity (ML) (1+10) at 121° C. of at most 80, preferably at most 75, more preferably at most 70 MU. In other terms, the fluoroelastomer (A) is a high molecular weight polymer, and not a fluorowax or a fluororubber of limited molecular weight. Indeed, this is an important feature, as techniques for making fluorubber without the addition to fluorosurfactants may be failing in providing access to such high molecular weight materials.

Still, in a further aspect, the present invention relates to an fluoroelastomer (A), i.e. a (per)fluoroelastomer comprising Iodine and/or Bromine chain ends, wherein said fluoroelastomer (A) comprises recurring units derived from VDF and from at least one monomer ($M_F$) different from VDF, wherein said fluoroelastomer (A):

- possesses a Mooney viscosity (ML) (1+10) at 121° C. of at least 10 MU;
- comprises $-CH_2OH$ chain ends in an amount of zero to less than 5 mmol/kg of fluoroelastomer (A);
- comprises hydrogen-comprising chain ends selected from the group consisting of $-CF_2H$ and $-CF_2CH_3$ in an amount of 0.01 to 10 mmol/kg of fluoroelastomer (A);
- comprises I/Br containing chain ends of formula $-CH_2-X$ (with X being I or Br, preferably I) in an amount of at least 65% moles, with respect to the total moles of chain ends,
- wherein said fluoroelastomer is produced by emulsion polymerization without addition of any fluorinated surfactant or hydrogenated surfactants.

Such fluoroelastomer (A) is advantageously obtained by coagulation according to standard techniques of the latex comprising particles of fluoroelastomer (A), as described above.

Such fluoroelastomer (A), when compound by adding the following curing ingredients; 30 phr of C-black N990 MT; 4.00 phr of triallylisocyanurate; 5.00 phr of ZnO and 3.00 of 2,5-Bis(tert-butylperoxy)-2,5-dimethylhexane, is such to possess:

- a difference $M_H$-$M_L$ of exceeding 20, preferably of exceeding 23, more preferably of exceeding 25 lbs·in, when determined by MDR at 160° C. according to ASTM D 5289, whereas $M_L$=Minimum torque (lb×in), and $M_H$=Maximum torque (lb×in);
- a compression set (C-SET) of less than 30, preferably of less than 28, more preferably of less than 25, when determined on O-ring specimen of standard AS568A type 214, according to the ASTM D 395, method B, at 200° C. for 70 h.

In a still further aspect, the present invention relates to a curable composition comprising:

- at least one fluoroelastomer (A), i.e. a (per)fluoroelastomer comprising Iodine and/or Bromine chain ends, wherein said fluoroelastomer (A) comprises recurring units derived from VDF and from at least one monomer ($M_F$) different from VDF, wherein said fluoroelastomer (A):
- possesses a Mooney viscosity (ML) (1+10) at 121° C. of at least 10 MU;
- comprises $-CH_2OH$ chain ends in an amount of zero to less than 5 mmol/kg of fluoroelastomer (A);
- comprises hydrogen-comprising chain ends selected from the group consisting of $-CF_2H$ and $-CF_2CH_3$ in an amount of 0.01 to 10 mmol/kg of fluoroelastomer (A);
- comprises I/Br containing chain ends of formula $-CH_2-X$ (with X being I or Br, preferably I) in an amount of at least 65% moles, with respect to the total moles of chain ends,
- wherein said fluoroelastomer is produced by emulsion polymerization without addition of any fluorinated surfactant or hydrogenated surfactant; and
- at least one organic peroxide.

Said organic peroxide is selected among those which are capable of generating radicals in the curing conditions.

Among the commonly used organic peroxides, mention can be made of dialkylperoxides, such as, for example di-terbutyl-peroxide and 2,5-dimethyl-2,5-di(terbutylperoxy) hexane; dicumyl peroxide; di-benzoyl peroxide; diterbutyl perbenzoate; di[1,3-dimethyl-3-(terbutylperoxy)butyl] carbonate.

The curable composition of the invention may further comprise:

(a) curing coagents, in amounts generally in the range of 0.5-10 phr, preferably 1-7 phr, with respect to the fluoroelastomer (A); among those commonly used are: triallyl-cyanurate; triallyl-isocyanurate (TAIC); tris (diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane; N,N'bisallylbicyclo-oct-7-ene-disuccinimide (BOSA); bis-olefins (OF), as described above, in particular bis-olefins of formula $CH_2=CH-(CF_2)_n-CH=CH_2$, triazines having the general formula:

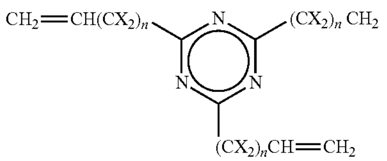

wherein X can be independently hydrogen, chlorine, fluorine $C_1$-$C_3$ alkyl or perfluoroalkyl; n is an integer in the range of 2-20, preferably 4-12, more preferably 4-8. TAIC is particularly preferred as curing coagent;

(b) a metal compound, in amounts in the range of 1-15 phr, 2-10 phr, with respect to the fluoroelastomer (A), selected from oxides or hydroxides of divalent metals, such as for instance, Mg, Zn, Ca or Pb, optionally associated with a weak acid salt, such as for example, Ba, Na, K, Pb, Ca stearates, benzoates, carbonates, oxalates or phosphites;

(c) other conventional additives, such as thickeners, pigments, antioxidants, reinforcing agents (e.g. carbon black), stabilizers and the like.

A method of making a cured part, and a cured part obtained from the curable composition above are additional objects of the present invention.

Said cured parts can be notably selected from pipes, joints, O-rings, hoses, and the like.

In a further aspect, the present invention relates to a method for the manufacture of a cured part, said method comprising processing and curing a curable composition comprising at least one fluoroelastomer (A), and at least one organic peroxide.

Said curable composition comprising fluoroelastomer (A) can be fabricated, e.g. by moulding (injection moulding, extrusion moulding), calendering, or extrusion, into the desired shaped article. The said cured part may be subjected to vulcanization (or curing) during the processing itself and/or in a subsequent step (post-treatment or post-cure).

Should the disclosure of any patents, patent applications, and publications which are incorporated herein by reference conflict with the description of the present application to the extent that it may render a term unclear, the present description shall take precedence.

Should the disclosure of any patents, patent applications, and publications, which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXPERIMENTAL SECTION

Materials:

Bruggolite® type E28, which is a mixture mainly composed of the following compounds:

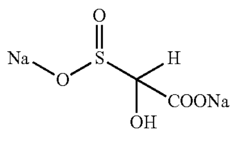

$Na_2SO_3$

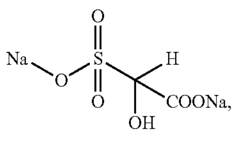

$Na_2SO_4$ was obtained from Bruggemann® and used as such.

Mooney Viscosity:

Mooney viscosity (ML) (1+10) at 121° C. was measured according to ASTM D1646.

Determination of End Groups

End groups were identified and quantified by NMR and/or by infrared spectroscopy according to the method described in PIANCA, M., et al. *J. Fluor. Chem.* 1999, p. 95-71. In the table below, the qualification "n.d."' is used to mean "not detectable", in connection with chain ends which are present in concentration lower than the limit of detection, i.e., lower than 0.05 mmol/Kg.

Example 1 of Comparison

In a 5 L vertical autoclave, equipped with a stirrer working at 630 rpm, were introduced after evacuation 2.7 L of demineralized water. The autoclave was then heated to 60° C. and maintained at such temperature for the entire duration of the reaction. The pressure of the autoclave was increased by 12 bar by feeding HFP monomer. A gaseous mixture of the following monomers was fed to the autoclave so as to bring the pressure to 26 bar: vinylidene fluoride (VDF) 48.5% by moles, hexafluoropropene (HFP) 26.5% by moles and tetrafluoroethylene (TFE) 25% by moles. Then, 3.42 g of $C_4F_8I_2$ and 0.23 g of a bis-olefin of formula $H_2C{=}CH{-}(CF_2)_6{-}CH{=}CH_2$ were introduced. A 29.4 g/L solution of t-butyl hydroperoxide (TBHP) in demineralized water was pumped in the autoclave at a constant nominal feed rate. Simultaneously, but separately, a 62 g/L solution of Bruggolite® type E28 in demineralized water was pumped in the autoclave at essentially similar feed rate as TBHP. After initiation, the VDF/HFP/TFE mixture was continuously fed to keep a constant pressure, and a total of 3.77 g of bis-olefin, as detailed above, were added in 19 steps. At a monomer conversion of 240 g, 5.14 g of $C_4F_8I_2$ were added. A final aliquot of 2.85 g of $C_4F_8I_2$ was introduced at a monomer conversion of 960 g.

The polymerization was continued until an overall monomer consumption of 1200 g was reached after 83 minutes; during such reaction time, 80 mL and 78 mL of above detailed solutions of E28 and THBP, respectively, were fed; then the autoclave was depressurized, vented and cooled.

The obtained latex had a solid content of 27.6% by weight. After coagulation with a solution of $Al_2(SO_4)_3$ and drying, fluoroelastomer crumbs (1159 g) were collected, possessing a Mooney viscosity (ML) (1+10) at 121° C. of 21 MU.

Example 2 of Comparison

Same procedure as in Ex. 1C was followed, except that the initial charge of $C_4F_8I_2$ and of bis-olefin of formula $H_2C{=}CH{-}(CF_2)_6{-}CH{=}CH_2$ were respectively of 2.86 g and 0.23 g, and a continuous constant feed of a 14.7 g/L solution of TBHP in demineralized water was pumped in the autoclave, together with a continuous separate constant and essentially similar feed of a 31 g/L solution of Bruggolite® type E28 in demineralized water. After initiation, the VDF/HFP/TFE mixture was continuously fed to keep a constant pressure, and a total of 3.77 g of bis-olefin were added in 19 steps. At a monomer conversion of 240 g, 4.08 g of $C_4F_8I_2$ were added. A final aliquot of 2.45 g of $C_4F_8I_2$ was introduced at a monomer conversion of 960 g.

The polymerization was continued until an overall monomer consumption of 1200 g was reached after 160 minutes; during such reaction time, 128 mL and 137 mL of above detailed solutions of E28 and THBP, respectively, were fed then the autoclave was depressurized, vented and cooled.

The obtained latex had a solid content of 27.6% by weight. After coagulation with a solution of $Al_2(SO_4)_3$ and drying (1158 g), a Mooney viscosity (ML) (1+10) at 121° C. of 25 MU was measured on so obtained fluoroelastomer crumbs.

Example 3 of Comparison

Same procedure as in Ex. 2C was followed, except that initial HFP pressure was 13 bar, followed to same VDF/HFP/TFE mixture up to 26 bar, followed by same initial charge of $C_4F_8I_2$ and bis-olefin of formula $H_2C{=}CH-(CF_2)_6-CH{=}CH_2$ as in Ex. 2C. A continuous constant feed of a 8.4 g/L solution of TBHP in demineralized water was accompanied by a continuous separate constant and essentially similar feed of a 17 g/L solution of Bruggolite® type E28 in demineralized water. After initiation, the VDF/HFP/TFE mixture was continuously fed to keep a constant pressure, and a total of 3.77 g of bis-olefin were added in 19 steps. At a monomer conversion of 240 g, 4.08 g of $C_4F_8I_2$ were added. A final aliquot of 2.45 g of $C_4F_8I_2$ was introduced at a monomer conversion of 960 g.

The polymerization was continued until an overall monomer consumption of 1200 g was reached after 187 minutes; during such reaction time, 160 mL and 171 mL of above detailed solutions of E28 and THBP, respectively, were fed, then the autoclave was depressurized, vented and cooled.

The obtained latex had a solid content of 24.5% by weight. After coagulation with a solution of $Al_2(SO_4)_3$ and drying (1027 g), a Mooney viscosity (ML) (1+10) at 121° C. of 29 MU was measured on so obtained fluoroelastomer crumbs.

Example 4 (According to the Invention)

Same procedure as in Ex. 1 was followed, except that initial HFP pressure was 12.5 bar, followed to same VDF/HFP/TFE mixture up to 26 bar, followed by an initial charge of $C_4F_8I_2$ (2.45 g) and bis-olefin of formula $H_2C{=}CH-(CF_2)_6-CH{=}CH_2$ (0.23 g). A continuous constant feed of a 2.8 g/L solution of TBHP in demineralized water was accompanied by a continuous separate constant and essentially similar feed of a 8 g/L solution of Bruggolite® type E28 in demineralized water.

After initiation, the VDF/HFP/TFE mixture was continuously fed to keep a constant pressure, and a total of 3.77 g of bis-olefin were added in 20 steps. At a monomer conversion of 240 g, 3.67 g of $C_4F_8I_2$ were added. A final aliquot of 2.04 g of $C_4F_8I_2$ was introduced at a monomer conversion of 960 g.

The polymerization was continued until an overall monomer consumption of 1200 g was reached after 171 minutes; during such reaction time, 154 mL and 158 mL of above detailed solutions of E28 and THBP, respectively, were fed; then the autoclave was depressurized, vented and cooled.

The obtained latex had a solid content of 24.6% by weight. After coagulation with a solution of $Al_2(SO_4)_3$ and drying (1048 g), a Mooney viscosity (ML) (1+10) at 121° C. of 48 MU was measured on so obtained fluoroelastomer crumbs.

Example 5 (According to the Invention)

Same procedure as in Ex. 4 was followed, with same initial HFP pressurization, and subsequent pressurization with VDF/HFP/TFE mixture, and with same initial charge of $C_4F_8I_2$ (2.45 g) and bis-olefin of formula $H_2C{=}CH-(CF_2)_6-CH{=}CH_2$ (0.23 g). Initiation was achieved by pumping at constant feed rate a 1.4 g/L solution of TBHP in demineralized water, and by separately pumping at an essentially similar feed rate a 4 g/L solution of Bruggolite® type E28 in demineralized water.

After initiation, the VDF/HFP/TFE mixture was continuously fed to keep a constant pressure, and a total of 3.77 g of bis-olefin were added in 20 steps. At a monomer conversion of 240 g, 3.67 g of $C_4F_8I_2$ were added. A final aliquot of 2.04 g of $C_4F_8I_2$ was introduced at a monomer conversion of 960 g.

The polymerization was continued until an overall monomer consumption of 1200 g was reached after 238 minutes; during such reaction time, 218 mL and 212 mL of above detailed solutions of E28 and THBP, respectively, were fed; then the autoclave was depressurized, vented and cooled.

The obtained latex had a solid content of 22.5% by weight. After coagulation with a solution of $Al_2(SO_4)_3$ and drying (935 g), a Mooney viscosity (ML) (1+10) at 121° C. of 65 MU was measured on so obtained fluoroelastomer crumbs.

Example 6 (According to the Invention)

In a 22 L vertical autoclave, equipped with a stirrer working at 450 rpm, were introduced after evacuation 11.5 L of demineralized water. The autoclave was then heated to 60° C. and maintained at such temperature for the entire duration of the reaction. The pressure of the autoclave was increased by 13.7 bar by feeding HFP monomer. A gaseous mixture of the following monomers was fed to the autoclave so as to bring the pressure to 26 bar: vinylidene fluoride (VDF) 48.5% by moles, hexafluoropropene (HFP) 26.5% by moles and tetrafluoroethylene (TFE) 25% by moles. Then, 10.61 g of $C_4F_8I_2$ and 0.90 g of bis-olefin of formula $H_2C{=}CH-(CF_2)_6-CH{=}CH_2$ were introduced. A 8.22 g/L solution of t-butyl hydroperoxide in demineralized water was pumped in the autoclave at a constant feed rate. Simultaneously, but separately, a 23.5 g/L solution of Bruggolite® type E28 in demineralized water was pumped in the autoclave at essentially similar feed rate. After initiation, the VDF/HFP/TFE mixture was continuously fed to keep a constant pressure, and a total of 16.49 g of bis-olefin were added in 19 steps. After the instantaneous monomer conversion had exceeded 2000 g/h, TBHP and Bruggolite® E28 feed rates were decreased of about 25%, and kept constant for the remainder of the reaction. At a monomer conversion of 1056 g, 16.33 g of $C_4F_8I_2$ were added. A final aliquot of 8.98 g of $C_4F_8I_2$ was introduced at a monomer conversion of 4224 g.

The polymerization was continued until an overall monomer consumption of 5280 g was reached after 212 minutes; during such reaction time, 209 mL and 204 mL of above detailed solutions of E28 and THBP were fed, respectively; then the autoclave was depressurized, vented and cooled.

The obtained latex had a solid content of 26.6% by weight. After coagulation with a solution of $Al_2(SO_4)_3$ and drying (4538 g), a Mooney viscosity (ML) (1+10) at 121° C. of 23 MU was measured on so obtained fluoroelastomer crumbs.

Example 7 (According to the Invention)

Same procedure as in Ex. 6 was followed, with same initial HFP pressurization, and subsequent pressurization with VDF/HFP/TFE mixture, and with same initial charge of $C_4F_8I_2$ (10.61 g) and bis-olefin of formula $H_2C{=}CH-(CF_2)_6-CH{=}CH_2$ (0.90 g). Initiation was achieved by pumping at constant feed rate a 8.22 g/L solution of TBHP in demineralized water, and by separately pumping at an essentially similar feed rate a 17.3 g/L solution of Bruggolite® type E28 in demineralized water.

After initiation, the VDF/HFP/TFE mixture was continuously fed to keep a constant pressure, and a total of 16.53 g of bis-olefin were added in 20 steps. At a monomer conversion of 1056 g, 16.33 g of $C_4F_8I_2$ were added. A final aliquot of 8.98 g of $C_4F_8I_2$ was introduced at a monomer conversion of 4224 g.

The polymerization was continued until an overall monomer consumption of 5280 g was reached after 197 minutes; during such reaction time, 206 mL and 189 mL of above detailed solutions of E28 and THBP, respectively, were fed; then the autoclave was depressurized, vented and cooled.

The obtained latex had a solid content of 26.1% by weight. After coagulation with a solution of $Al_2(SO_4)_3$ and drying (4453 g), a Mooney viscosity (ML) (1+10) at 121° C. of 25 MU was measured on so obtained fluoroelastomer crumbs Table 1 (a & b) summarizes in table format most relevant polymerization conditions as followed in Ex. 1C, 2C, 3C of comparison and 4, 5, 6, and 7 according to the invention.

TABLE 1 (a)

| | | Ex. 1C | Ex. 2C | Ex. 3C |
|---|---|---|---|---|
| polymerization duration | minutes | 83 | 160 | 187 |
| Weight target fluoroelastomer (A) | g | 1200 | 1200 | 1200 |
| Aqueous medium | L | 2.7 | 2.7 | 2.7 |
| Polymerization rate | g/(h × L) | 321 | 167 | 143 |
| THBP | g/kg FKM | 1.91 | 1.68 | 1.20 |
| THBP | mmol $O_2$/kg FKM | 21.19 | 18.64 | 13.31 |
| E28 | g/kg FKM | 4.13 | 3.31 | 2.27 |
| $C_4F_8I_2$ | g/kg FKM | 9.50 | 7.80 | 7.80 |
| | g I/kg FKM | 5.31 | 4.36 | 4.36 |
| Ratio I/E28 | g I/g E28 | 1.29 | 1.32 | 1.92 |
| Ratio I/TBHP | mol I/mol $O_2$ | 1.98 | 1.85 | 2.59 |

TABLE 1 (b)

| | | Ex. 4 | Ex. 5 | Ex. 6 | Ex. 7 |
|---|---|---|---|---|---|
| polymerization duration | minutes | 171 | 238 | 212 | 197 |
| Target weight fluoroelastomer (A) | g | 1200 | 1200 | 5280 | 5280 |
| Aqueous medium | L | 2.7 | 2.7 | 11.5 | 11.5 |
| Polymerization rate | g/(h × L) | 156 | 112 | 130 | 140 |
| THBP | g/kg FKM | 0.37 | 0.25 | 0.32 | 0.29 |
| THBP | mol $O_2$/kg FKM | 4.10 | 2.77 | 3.55 | 3.22 |
| E28 | g/kg FKM | 1.03 | 0.73 | 0.93 | 0.67 |
| $C_4F_8I_2$ | g/kg FKM | 6.80 | 6.80 | 6.80 | 6.80 |
| | g I/kg FKM | 3.80 | 3.80 | 3.80 | 3.80 |
| Ratio I/E28 | g I/g E28 | 3.70 | 5.23 | 4.09 | 5.63 |
| Ratio I/TBHP | mol I/mol $O_2$ | 7.33 | 10.9 | 8.50 | 9.17 |

Table 2 (a & b) summarizes in table format most relevant features of the fluoroelastomers obtained from Ex. 1C, 2C, 3C of comparison and 4, 5, 6, and 7 according to the invention, including MDR and sealing properties, determined on a curable compound obtained by adding to the fluoroelastomers mentioned above, the following curing ingredients; 30 phr of C-black N990 MT from Cancarb; 4.00 phr of triallylisocyanurate (Drimix® TAIC 75, from Finco); 5.00 phr of ZnO (from Carlo Erba) and 3.00 of Luperox® 101 XL 45 (from Atofina).

Characterization of Cure Behaviour

Cure behaviour was characterized by Moving Die Rheometer (MDR) according to ASTM D 5289, at 160° C., by determining the following properties:

$M_L$=Minimum torque (lb×in)

$M_H$=Maximum torque (lb×in)

$t_{s2}$ is scorch time, i.e. time required for torque to increase of two units from $M_L$; $t_{90}$ is the time required for reaching 90% of $M_H$.

O-rings (size class=214) have been molded and cured in a pressed mould comprising 12 cavities at 160° C. for 10 minutes, and then post-treated in an air circulating oven in conditions at 230° C. (1 hour for getting to set point T° and 4 hours at set-point T°). Molding has been repeated 3 times for each recipe, so as to collect O-ring specimens. The compression set (C-SET) has been determined on O-ring specimen standard AS568A (type 214), according to the ASTM D 395, method B, at 200° C. for 70 h.

TABLE 2 (a)

| | | Ex. 1C | Ex 2C | Ex 3C |
|---|---|---|---|---|
| Mooney viscosity | (MU) | 21 | 25 | 29 |
| | Monomer composition | | | |
| VDF | (% mol) | 53.7 | 54.2 | 48.6 |
| HFP | (% mol) | 18.7 | 17.9 | 25.6 |
| TFE | (% mol) | 27.6 | 27.9 | 25.8 |
| | Characterization of chain ends | | | |
| —$CH_2I$ | (mmol/Kg) | 16 | 11 | 14 |
| —$CF_2H$ | (mmol/Kg) | 4 | 7 | 8 |
| —$CH_2OH$ | (mmol/Kg) | 10 | 2 | 3 |
| —$CF_2CH_3$ | (mmol/Kg) | 7 | 3 | 2 |
| —$CH_2I$ | (%) | 43 | 48 | 52 |
| | Crosslinking behavior by MDR | | | |
| $M_L$ | (lbs in) | 0.7 | 1.0 | 1.1 |
| $M_H$ | (lbs in) | 14.9 | 11.0 | 18.1 |
| $M_H - M_L$ | (lbs in) | 14.2 | 10.0 | 17.0 |
| $t_{s2}$ | (s) | 58 | 61 | 52 |

TABLE 2 (a)-continued

| | | Ex. 1C | Ex 2C | Ex 3C |
|---|---|---|---|---|
| $t_{90}$ | (s) | 189 | 207 | 195 |
| tan(□) | | 0.228 | 0.254 | 0.156 |
| | Sealing properties | | | |
| C-set | (%) | 64 | —(**) | 44 |

(**)no meaningful C-Set determination was possible, as molding attempts were not effective in providing O-ring specimen standard AS568A.

TABLE 2(b)

| | | Ex 4 | Ex 5 | Ex 6 | Ex 7 |
|---|---|---|---|---|---|
| Mooney viscosity | (MU) | 48 | 65 | 23 | 25 |
| | Monomer composition | | | | |
| VDF | (% mol) | 54.0 | 50.7 | 52.8 | 52.8 |
| HFP | (% mol) | 17.8 | 17.1 | 16.4 | 16.3 |
| TFE | (% mol) | 28.2 | 32.1 | 30.8 | 30.9 |

TABLE 2(b)-continued

| | | Ex 4 | Ex 5 | Ex 6 | Ex 7 |
|---|---|---|---|---|---|
| Characterization of chain ends | | | | | |
| $—CH_2I$ | (mmol/Kg) | 15 | 15 | 24 | 26 |
| $—CF_2H$ | (mmol/Kg) | 2 | 2 | 2 | 2 |
| $—CH_2OH$ | (mmol/Kg) | 4 | 1 | n.d. | n.d. |
| $—CF_2CH_3$ | (mmol/Kg) | n.d. | n.d. | n.d. | n.d. |
| $—CH_2I$ | (%) | 71 | 83 | 92 | 93 |
| Crosslinking behavior by MDR | | | | | |
| $M_L$ | (lbs in) | 1.3 | 1.9 | 0.5 | 0.5 |
| $M_H$ | (lbs in) | 28.4 | 29.6 | 32.5 | 32.2 |
| $M_H - M_L$ | (lbs in) | 27.1 | 27.7 | 32.0 | 31.7 |
| $t_{s2}$ | (s) | 43 | 42 | 45 | 41 |
| $t_{90}$ | (s) | 162 | 158 | 172 | 166 |
| tan(□) | | 0.066 | 0.056 | 0.031 | 0.040 |
| Sealing properties | | | | | |
| C-set | (%) | 24 | 21 | 14 | 14 |

Comparing MDR behaviour enables concluding that the fluoroelastomers of examples 4 to 7 according to the invention have significantly higher $M_H$-$M_L$ values than corresponding values of fluoroelastomers of comparative examples 1 to 3. Such higher $M_H$-$M_L$ values are representative of the ability to reach a significantly higher crosslinking density, and have faster crosslinking kinetics, as shown by lower $t_{90}$ values. As far as C-set is concerned, the fluoroelastomers of examples 4 to 7 according to the invention have significantly lower C-Set values than corresponding values of fluoroelastomers of comparative examples 1 to 3. Hence, their sealing ability is significantly better than the sealing ability of the comparative fluoroelastomers.

The invention claimed is:

1. A method of making a fluoroelastomer (A), which is a (per)fluoroelastomer comprising Iodine and/or Bromine chain ends, said method comprising polymerizing vinylidene fluoride (VDF), in the presence of at least one second (per)fluorinated monomer ($M_F$) different from VDF, in an aqueous emulsion in the presence of a chain transfer agent (CTA-X) having I and/or Br atoms and in the presence of a redox-initiating system (R) comprising at least one organic radical initiator (O) and at least one composition (CS) comprising at least one compound (S) bearing at least one sulfinic acid group, wherein:

the amount of initiator (O) is of at least 1.50 and at most 15.00 mmol of $O_2$ per kg of fluoroelastomer (A);

the amount of compound(S) is of at least 0.20 and at most 2.00 g per kg of fluoroelastomer (A); and the ratio between agent (CTA-X) and composition (CS) is of at least 2.00 and of at most 8.00 g of X/g of composition (CS), whereas X is the amount of I and/or Br in the agent (CTA-X); and wherein said emulsion polymerization is carried out without addition of any fluorinated surfactant or hydrogenated surfactant.

2. The method of claim 1, wherein monomer ($M_F$) is selected from the group consisting of:

$C_2$-$C_8$ perfluoroolefins;

hydrogen-containing $C_2$-$C_8$ olefins different from VDF;

$C_2$-$C_8$ chloro and/or bromo and/or iodo-fluoroolefins;

(per)fluoroalkylvinylethers (PAVE) of formula $CF_2{=}CFOR_f$, wherein $R_f$ is a $C_1$-$C_6$ (per)fluoroalkyl group;

(per)fluoro-oxy-alkylvinylethers of formula $CF_2{=}CFOX$, wherein X is a $C_1$-$C_{12}$ [(per)fluoro]-oxyalkyl comprising catenary oxygen atoms;

(per)fluorodioxoles having formula:

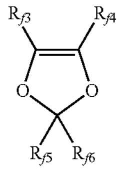

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom;

(per)fluoro-methoxy-vinylethers (MOVE) having formula: $CFX_2{=}CX_2OCF_2OR''_f$ wherein $R''_f$ is selected among linear or branched $C_1$-$C_6$ (per)fluoroalkyls; $C_5$-$C_6$ cyclic (per)fluoroalkyls; and $C_2$-$C_6$ (per)fluorooxyalkyls, linear or branched, comprising from 1 to 3 catenary oxygen atoms, and $X_2{=}F$, H;

and/or wherein fluoroelastomer (A) comprises, in addition to recurring units derived from VDF, recurring units derived from hexafluoropropylene (HFP), and may comprise one or more of the following:

recurring units derived from at least one bis-olefin (OF) having general formula:

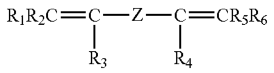

wherein $R_1$, $R_2$, $R_3$, $R_4$, $R_5$ and $R_6$, equal or different from each other, are H, a halogen, or a $C_1$-$C_5$ optionally halogenated group, optionally comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one monomer ($M_F$) different from VDF and HFP; and recurring units derived from at least one hydrogenated monomer.

3. The method of claim 1, wherein said agent (CTA-X) is selected from the group consisting of:

iodinated and/or brominated organic chain-transfer agent(s); and alkali metal or alkaline-earth metal iodides and/or bromides; and/or wherein said agent (CTA-X) is selected from the group consisting of those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$; and/or wherein the ratio between agent (CTA-X) and composition (CS) is of at least 2.50 and/or of at most 7.60 g of X/g of composition (CS), whereas X is the amount of I and/or Br in the agent (CTA-X); and/or wherein agent (CTA-X) is a iodinated chain transfer agent, and wherein the amounts of (CTA-X) and composition (CS) are such that the iodine/composition (CS) ratio is of at least 2.00 and of at most 7.60 g of I/g of composition (CS).

4. The method of claim 1, wherein initiator (O) is selected from the group consisting of:

(b) diacylperoxides;

(c) dialkylperoxides;

(d) hydroperoxides;

(e) per-acids esters and salts thereof;

(f) peroxydicarbonates; and/or wherein the amount of initiator (O) is of at most 12.00 mmol of $O_2$ per kg of fluoroelastomer (A); and/or in an amount of at least 1.80 mmol of $O_2$ per kg of fluoroelastomer (A); and/or wherein the molar ratio between the halogen content of (CTA-X) and the peroxide content of the initiator (O) is of at least 3.00 in mol of X/mol of $O_2$ and/or of at most 15.00 in mol of X/mol of $O_2$.

5. The method of claim 1, wherein said compound(S) complies with the following formula (S-I):

(S-I)

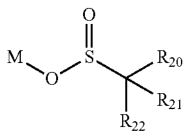

wherein

M is a hydrogen atom, an ammonium ion, or a monovalent metal ion;

$R_{20}$ is —OH or —$N(R^4)(R^5)$ where each of $R^4$ and $R^5$, identical or different from one another, are hydrogen atom or linear or branched alkyl chain having from 1 to 6 carbon atoms;

$R^{21}$ is hydrogen atom, linear or branched alkyl group having from 1 to 6 carbon atoms, 5- or 6-membered cycloalkyl group, 5- or 6-membered aryl group;

$R^{22}$ is —COOM, —$SO_3M$, —C(═O)$R^4$, —C(═O)N($R^4$)($R^5$), —C(═O)O$R^4$, and salt thereof with at least one monovalent metal ion; and/or wherein said composition (CS) comprises at most 50 wt of a compound complying with formula (S-I), with respect to the total weight of said composition (CS); and/or wherein said composition (CS) further comprises a compound ($S_3$) comprising at least one sulfonic acid group, said compound ($S_3$) complying with the following formula ($S_3$—I):

($S_3$-I)

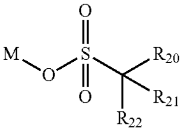

wherein M is a monovalent metal ion; and/or wherein said composition (CS) comprises at least 5 wt. % of a compound complying with formula ($S_3$—I), with respect to the total weight of said composition (CS); and/or wherein said composition (CS) further comprises at least one of:

sulphurous acid or a salt thereof; and sulphuric acid or a salt thereof.

6. The method of claim 2, wherein monomer ($M_F$) is selected from the group consisting of:

$C_2$-$C_8$ perfluoroolefins, selected from tetrafluoroethylene (TFE) and hexafluoropropylene (HFP);

hydrogen-containing $C_2$-$C_8$ olefins different from VDF, selected from vinyl fluoride (VF), trifluoroethylene (TrFE), perfluoroalkyl ethylenes of formula $CH_2$═CH—$R_f$, wherein $R_f$ is a $C_1$-$C_6$ perfluoroalkyl group;

$C_2$-$C_8$ chloro and/or bromo and/or iodo-fluoroolefins selected from chlorotrifluoroethylene (CTFE);

(per)fluoroalkylvinylethers (PAVE) of formula $CF_2$═CF$OR_f$, wherein $R_f$ is a $C_1$-$C_6$ (per)fluoroalkyl group selected from —$CF_3$, —$C_2F_5$, —$C_3F_7$;

(per)fluoro-oxy-alkylvinylethers of formula $CF_2$═CFOX, wherein X is a perfluoro-2-propoxypropyl group;

(per)fluorodioxoles having formula:

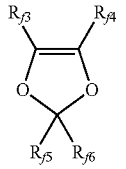

wherein $R_{f3}$, $R_{f4}$, $R_{f5}$, $R_{f6}$, equal or different from each other, are independently selected among fluorine atoms and $C_1$-$C_6$ (per)fluoroalkyl groups, selected from —$CF_3$, —$C_2F_5$, —$C_3F_7$, —$OCF_3$, —$OCF_2CF_2OCF_3$;

(per)fluoro-methoxy-vinylethers (MOVE) having formula: $CFX_2$═$CX_2OCF_2OR''_f$ wherein $X_2$═F, and $R''_f$ is —$CF_2CF_3$ (MOVE1); —$CF_2CF_2OCF_3$ (MOVE2); or —$CF_3$ (MOVE3);

and/or wherein fluoroelastomer (A) comprises, in addition to recurring units derived from VDF, recurring units derived from hexafluoropropylene (HFP), and may comprise one or more of the following:

recurring units derived from at least one bis-olefin (OF) having general formula:

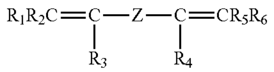

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical; wherein bis-olefin (OF) is a bis-olefin (OF-1) of formula:

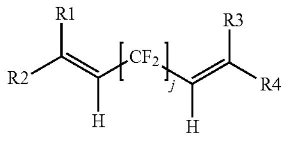

wherein j is an integer between 2 and 10, and $R_1$, $R_2$, $R_3$, $R_4$, equal or different from each other, are H, F or $C_{1-5}$ alkyl or (per)fluoroalkyl group, such as $H_2C{=}CH{-}(CF_2)_6{-}CH{=}CH_2$;

recurring units derived from at least one monomer ($M_F$) different from VDF and HFP; and recurring units derived from at least one hydrogenated monomer.

7. The method of claim 1, wherein said agent (CTA-X) is selected from the group consisting of:

iodinated and/or brominated organic chain-transfer agent(s) selected from those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$; and alkali metal or alkaline-earth metal iodides and/or bromides; and/or wherein said agent (CTA-X) is selected from the group consisting of those of formula $R_f(I)_x(Br)_y$, which is of formula $R'_f(I)_{x'}(Br)_{y'}$, in which $R'_f$ is a perfluoroalkyl containing from 1 to 8 carbon atoms, while x' and y' are integers between 0 and 2, with $1 \leq x'+y' \leq 2$; and/or wherein the ratio between agent (CTA-X) and composition (CS) is of at least 3.20 and/or of at most 7.50, g of X/g of composition (CS), whereas X is the amount of I and/or Br in the agent (CTA-X); and/or wherein agent (CTA-X) is a iodinated chain transfer agent, and wherein the amounts of (CTA-X) and composition (CS) are such that the iodine/composition (CS) ratio is of at least 2.50 and of at most 7.50 g of I/g of composition (CS).

8. The method of claim 1, wherein initiator (O) is selected from the group consisting of:

(b) diacylperoxides selected from diacetylperoxide, disuccinyl peroxide, dipropionylperoxide, dibutyrylperoxide, dibenzoylperoxide, dilauroyl-peroxide; benzoylacetylperoxide, diglutaric acid peroxide;

(c) dialkylperoxides selected from ditertbutylperoxide (DTBP), t-butyl cumyl peroxide; 2,5-dimethyl-2,5-di(t-butylperoxy) hexane; dicumyl peroxide; 1,1-di(t-butylperoxy)-3,3,5-trimethylcyclohexane; di-tertamyl peroxide;

(d) hydroperoxides selected from t-butyl hydroperoxide (TBHP), cumene hydroperoxide, tertiaryamylhydroperoxide;

(e) per-acids esters and salts thereof selected from peracetic acid, and ammonium, sodium or potassium salts thereof, tert-butyl peroxybenzoate, tert-butylperoxyacetate and tert-butylperoxypivalate;

(f) peroxydicarbonates selected from diisopropylperoxydicarbonate, tert-butyl-peroxyisopropylcarbonate; di-n-propylperoxydicarbonate, dicyclohexylperoxydicarbonate, di-n-butyl peroxydicarbonate, di-2-ethylhexylperoxydicarbonate, dimyristyl peroxydicarbonate, dicetyl peroxydicarbonate, diethylperoxydicarbonate; and/or wherein the amount of initiator (O) is of at most 10.00 mmol of $O_2$ per kg of fluoroelastomer (A); and/or in an amount of at least 2.00 mmol of $O_2$ per kg of fluoroelastomer (A); and/or wherein the molar ratio between the halogen content of (CTA-X) and the peroxide content of the initiator (O) is of at least 3.50 in mol of X/mol of $O_2$ and/or of at most 13.00 in mol of X/mol of $O_2$.

9. The method of claim 5, wherein sulphurous acid or a salt thereof is selected from sodium sulphite and sodium hydrogen sulphite; and sulphuric acid or a salt thereof is selected from sodium sulphate and sodium hydrogen sulphate.

* * * * *